Figure 1:
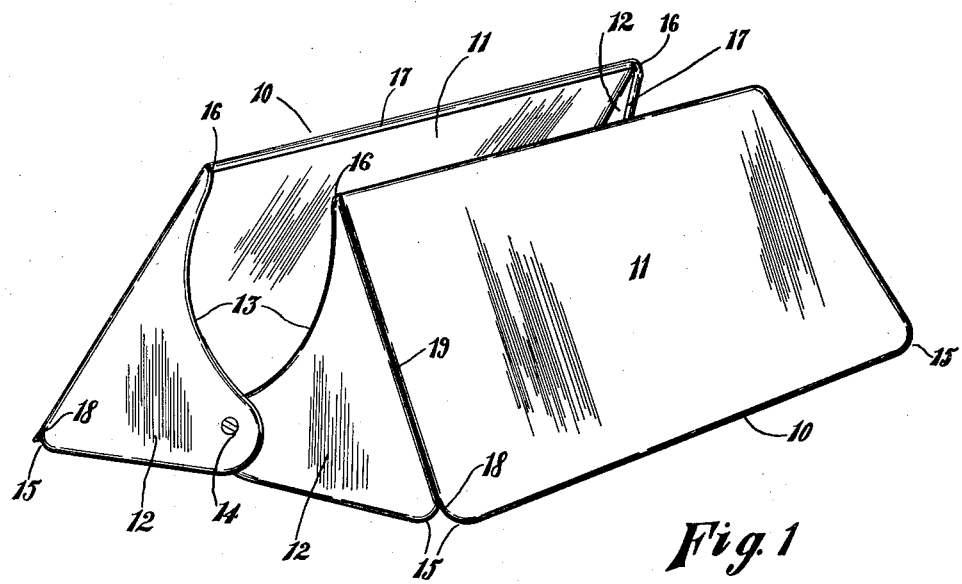

March 12, 1940. E. E. GEORGE 2,193,169

TIRE STAND

Filed Oct. 25, 1938

Inventor
Edgar E. George

By Frease and Bishop
Attorneys

Patented Mar. 12, 1940

2,193,169

UNITED STATES PATENT OFFICE 2,193,169

TIRE STAND

Edgar E. George, Canton, Ohio, assignor to Dura-Products Manufacturing Company, Canton, Ohio, a corporation of Ohio Application October 25, 1938, Serial No. 236,902

2 Claims. (Cl. 211—24)

The invention relates to display stands for supporting automobile, truck, airplane, tractor and motorcycle tires in upright position for display and advertising purposes.

Display stands of this general type, formed of two similar sheet metal parts, have come into quite general use, but such stands as are now being used are objectionable because the edges of the sheet metal parts of the stand mar the display floor, table or other horizontal surface upon which the stand is mounted, and also damage the tires displayed thereon, because of the sharp corners and raw edges of the sheet metal contacting the polished surface of the display floor or table as well as the rubber tire casing.

An object of the present invention is to provide a tire display stand formed of sheet metal or the like and so constructed that it will not mar the highly polished surface of the display floor or table upon which the stand is mounted or the rubber tire casing which is supported thereon.

A further object is to provide a stand of this character in which all of the corners of the two similar halves of the stand are rounded.

Another object is to provide a tire stand of this character in which all of the edges of each member of the tire stand are folded or beaded so as to present smooth surfaces to the display floor or table as well as to the tire, and also to give greater strength to the stand.

Figure 2:
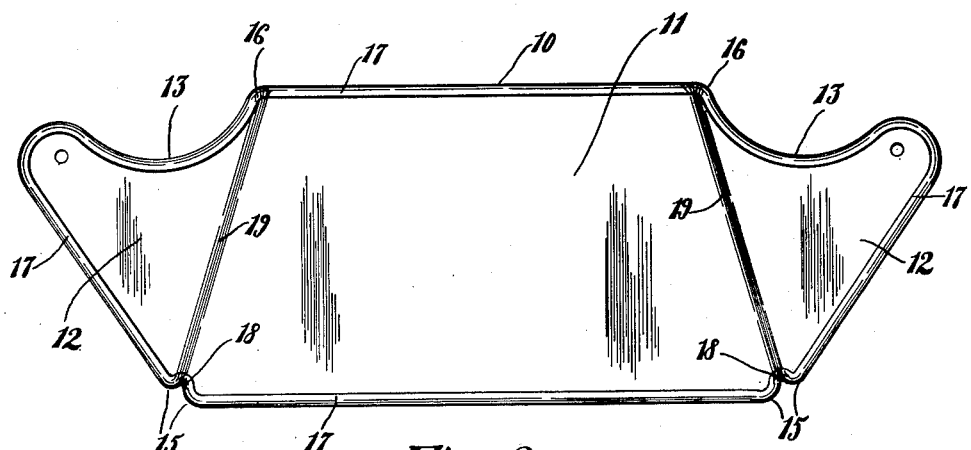

The above objects together with others which will be apparent from the drawing and following description, or which may be later referred to may be attained by constructing the improved tire display stand in the manner illustrated in the accompanying drawing in which:

Figure 1 is a perspective view of a tire display stand embodying the invention; and Fig. 2, an elevation of one member of the display stand before the wings at the ends thereof have been bent angularly for assembling the stand.

Similar numerals refer to similar parts throughout the drawing.

The tire display stand to which the invention pertains, is formed of two similar members, each indicated generally by the numeral 10, each of which may be cut from a single blank of sheet metal or other material having similar properties, one of the members being shown in Fig. 2 before bending to the operative position.

Each of the elements 10 may comprise a body portion 11 which may be in the form of a trapezoid, as shown, and provided with substantially triangular wing portions 12 at each end thereof.

The upper edge of each of the substantially triangular wings 12 is preferably concaved as indicated at 13 so that when two of the members are connected together as by bolts or rivets 14 located through the adjoining end portions of the wings, a tire may be supported by the stand, the tread portion of the tire resting upon the curved edges 13 while the upper edges of the body portions 11 of the members contact opposite sides of the tire and hold the same in upright position.

The general shape and construction of the tire stand may be such as illustrated in the drawing or of other conventional design, the invention to which this application is directed consisting in notching and rounding the lower corners as indicated at 15 so as to prevent marring the polished surface of a floor, table or the like upon which the stand may be placed, and the upper corners 16 so as to prevent damage to the tire which is supported upon the stand; and in folding or beading the entire edge portion of each member of the stand as indicated at 17 so that no sharp or raw edge of the sheet metal will come in contact with either the supporting surface or the tire.

It will thus be seen that when the improved tire stand is used to support a rubber tire casing in a display room, showcase or the like, the folded or beaded lower edges 17 of the body panels and wing portions of the two members of the stand as well as the rounded lower corners 15 thereof will contact with the surface of the floor, table or other supporting surface upon which the stand is mounted so that the same will not be marred or scratched.

It will also be seen that the rubber tire will contact only the folded or beaded edges around the arcuate portions 13 of the wing panels and the upper edges 17 of the body panels of the members so that no sharp or raw edge of the metal will contact the rubber tire and mar the same.

It will also be evident that the folded or beaded edges running entirely around each member of the improved tire stand will also considerably strengthen the same so that the stand will not be bent or distorted by the weight of the tire carried thereon.

The rounded lower corners 15 of the body and wing panels are preferably so formed as to produce a notch 18 between each pair of rounded corners 15, at the lower end of the angular line 19, upon which the end panels are bent, thus forming a better rounded surface for contact with the floor or table upon which the stand is placed.

I claim:

1. A display stand for tires comprising two similar sheet metal members, each member consisting of a body panel and angular wing panels at its ends, the wing panels of each member connected to the wing panels of the other member, the lower corners of each member at the junctions of the body panel and wing panels being notched and rounded, the entire edge portion of each member including said notched corners being folded.

2. A display stand for tires comprising two similar sheet metal members, each member consisting of a body panel and angular wing panels at its ends, the wing panels of each member connected to the wing panels of the other member, the upper corners of each member at the junctions of the body panel and wing panels being rounded, the lower corners of each member at the junctions of the body panel and wing panels being notched, the entire edge portion of each member including said notched and rounded corners being folded.

EDGAR E. GEORGE.